United States Patent [19]

Burns et al.

[11] 4,364,831
[45] Dec. 21, 1982

[54] CHIP CONVEYOR

[75] Inventors: Donald L. Burns, Oshtemo Township, Kalamazoo County; John M. Harbour; James J. Lister, both of Kalamazoo, all of Mich.

[73] Assignee: Kalamazoo Conveyor Company, Kalamazoo, Mich.

[21] Appl. No.: 216,346

[22] Filed: Dec. 15, 1980

[51] Int. Cl.³ ............................ B65G 33/14; B01D 21/24
[52] U.S. Cl. .................................... 210/298; 210/523; 198/558
[58] Field of Search ............ 210/803, 298, 523, 532.1; 198/558, 566, 608, 625, 663

[56] References Cited

U.S. PATENT DOCUMENTS

| | | | |
|---|---|---|---|
| 1,762,593 | 6/1930 | Schwarz | 210/298 X |
| 2,414,176 | 1/1947 | Smith et al. | 210/298 X |
| 2,612,178 | 9/1952 | Skinner | 210/523 X |
| 2,861,688 | 11/1958 | Harms | 210/298 X |
| 3,865,727 | 2/1975 | Broling | 210/523 X |
| 4,052,311 | 10/1977 | Martin | 210/298 X |
| 4,164,470 | 8/1979 | Briltz | 210/523 |
| 4,234,074 | 11/1980 | Martin | 198/558 |

*Primary Examiner*—Thomas G. Wyse
*Attorney, Agent, or Firm*—Blanchard, Flynn, Thiel, Boutell & Tanis

[57] ABSTRACT

A conveyor apparatus has a pair of inclined, parallel, adjacent upwardly facing semicylindrical troughs, an elongated helical flight rotatably disposed in each trough, and a drive mechanism for effecting rotation of the helical flights. The lower ends of the troughs are received in a tank having spaced side walls and having spaced baffle walls between the side walls which are parallel to the side walls and extend above at least a portion of the top edge of each side wall. These top edge portions of the side walls are each adjustable about an axis normal to the side wall to a substantially horizontal position and are releasably fixable in such position. Solids introduced between the baffle walls are conveyed by the rotating flights to the upper ends of the troughs, and liquid so introduced passes under said baffle walls and over the adjustable edge portions of the side walls.

11 Claims, 9 Drawing Figures

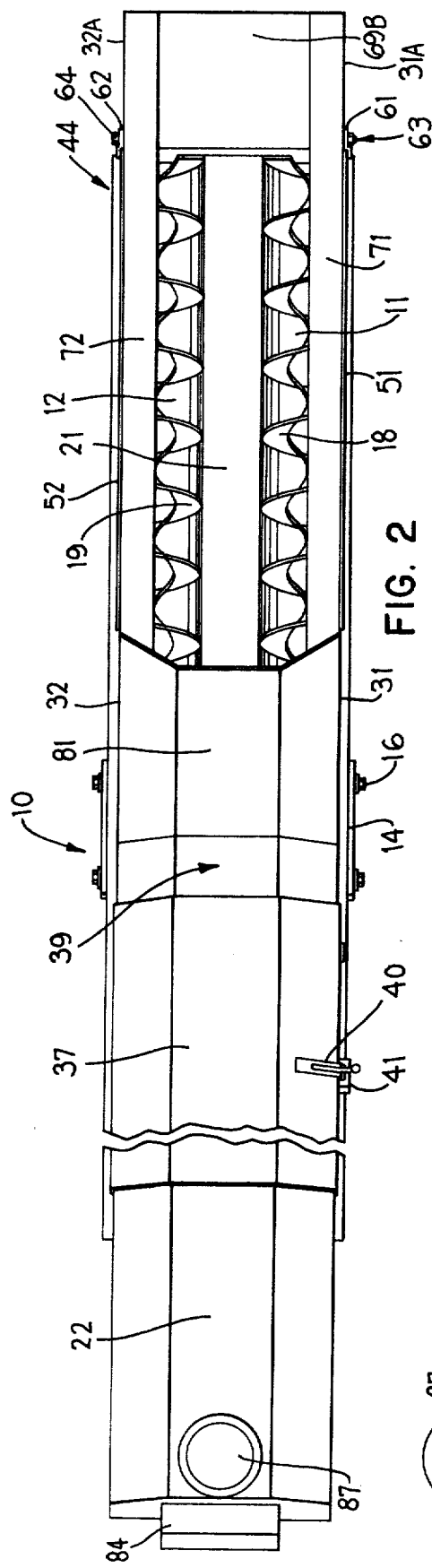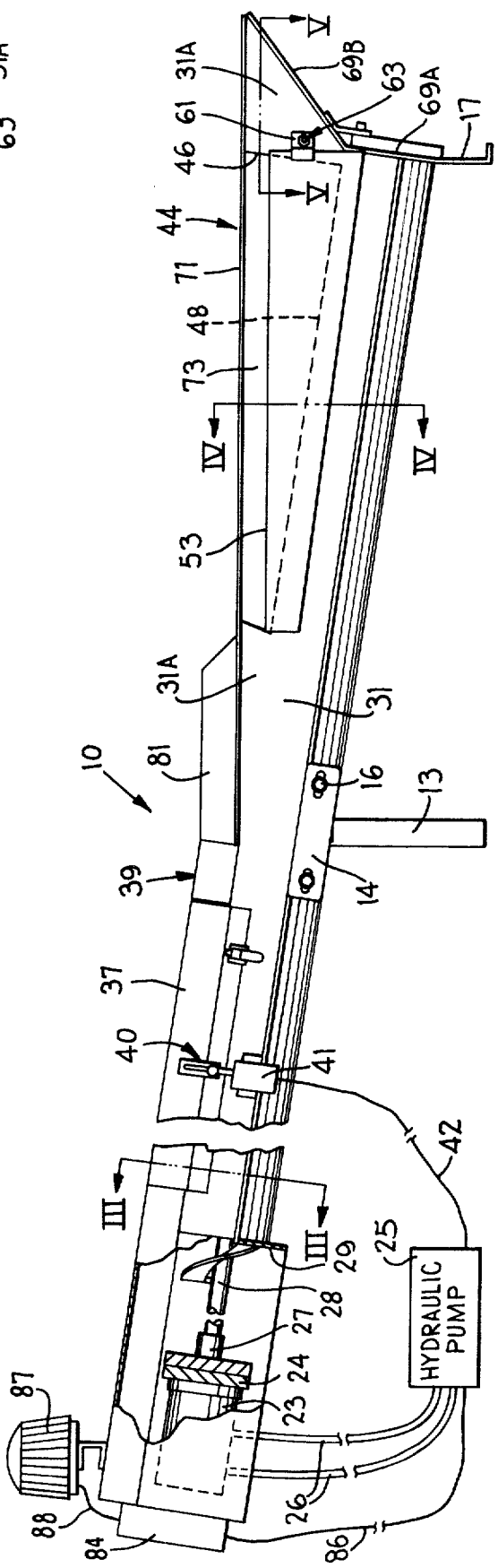

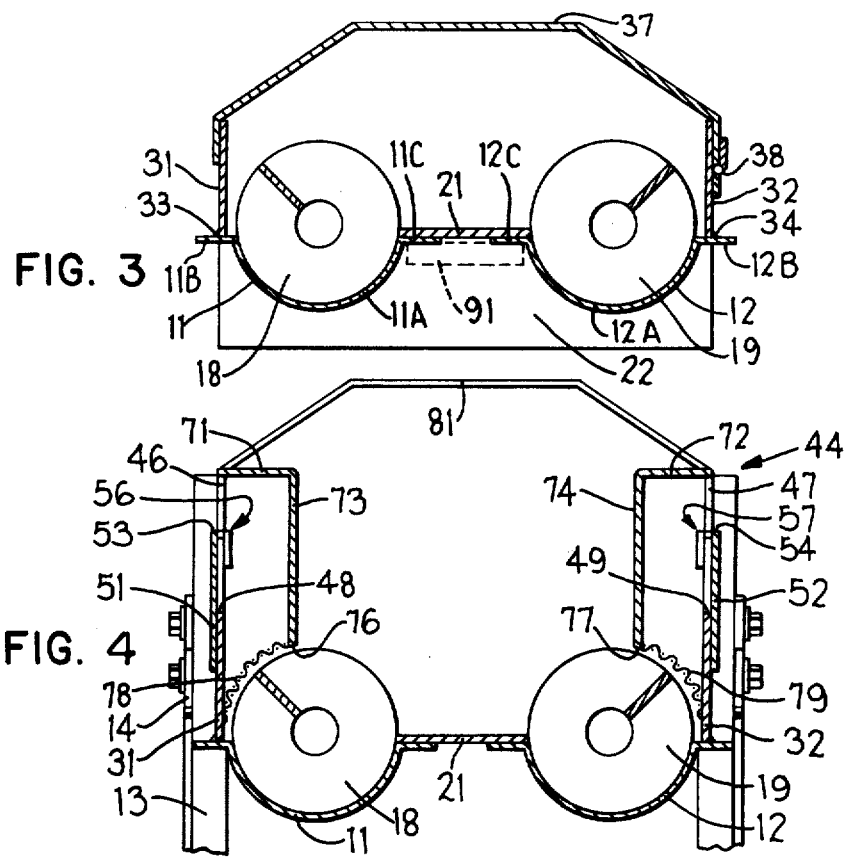
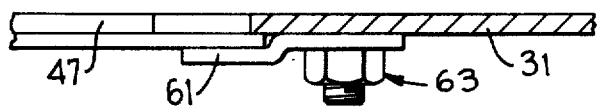
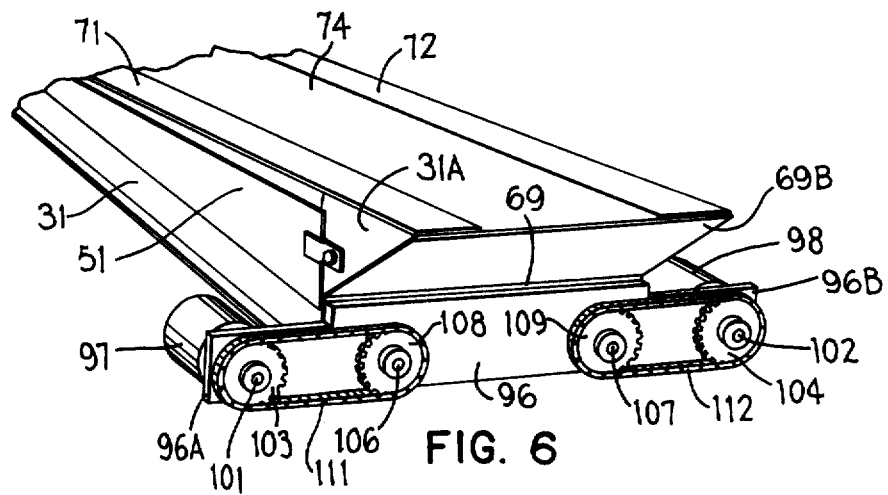

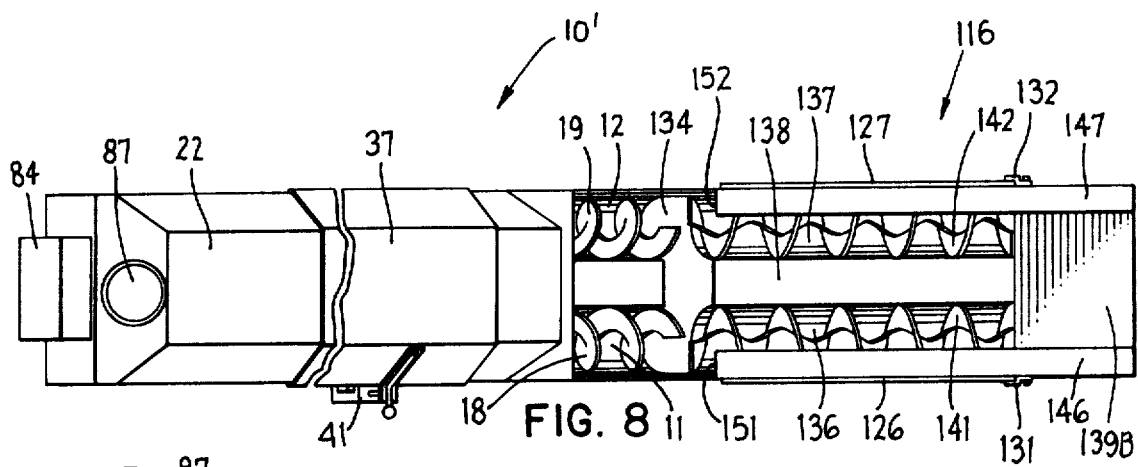
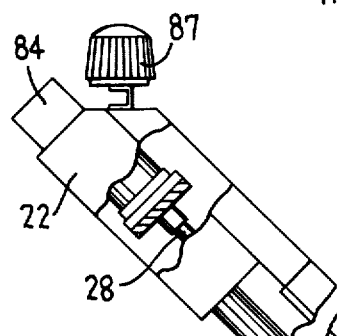
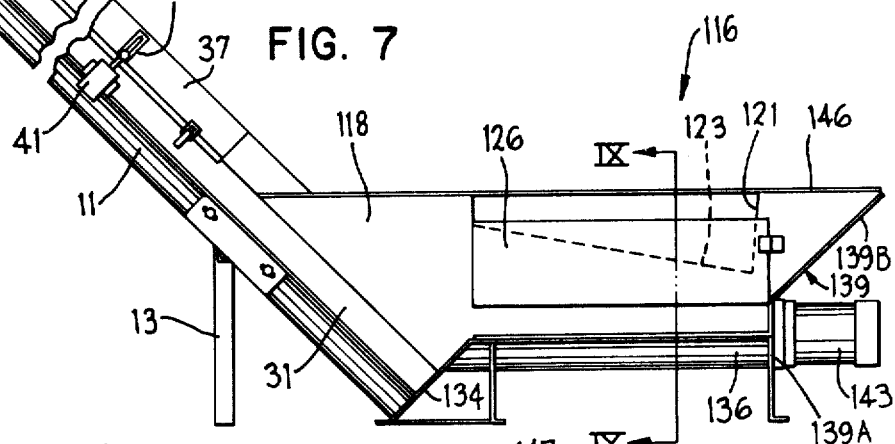
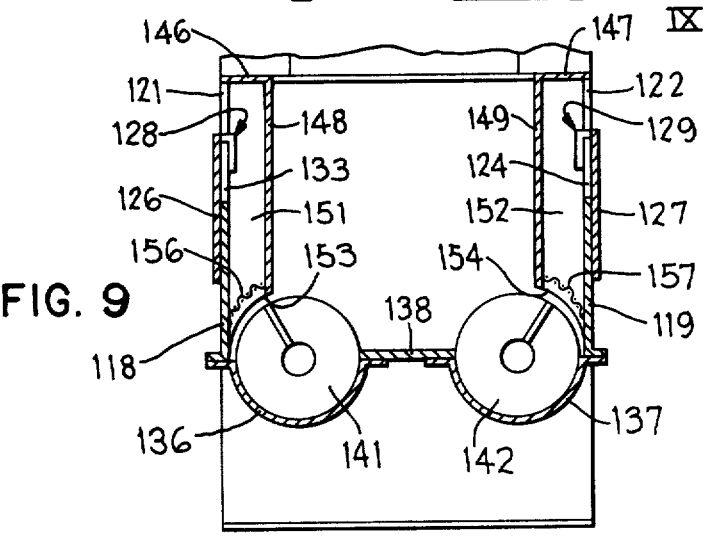

CHIP CONVEYOR

FIELD OF THE INVENTION

This invention relates to apparatus for separating solids from liquids and for conveying the solids from a lower to a higher elevation and, more particularly, relates to an apparatus of the foregoing type which utilizes helical flights rotatably supported in semicylindrical troughs.

BACKGROUND OF THE INVENTION

In the operation of milling machines, lathes and similar metal working tools, a liquid is utilized to cool and lubricate the tools and the metal parts being worked. The liquid also serves to flush away the resulting chips and cuttings. It is desirable for economic reasons to recirculate the liquid, but the chips and cuttings must first be separated from the liquid and then conveyed to a suitable waste receptacle.

Various types of devices have been designed for achieving this result, such as the apparatus disclosed in U.S. Pat. No. 4,052,311, issued Oct. 4, 1977 and entitled "APPARATUS FOR SEPARATING SOLIDS FROM LIQUIDS". This patent discloses the use of a rotating auger on an inclined support for moving solids, such as cuttings and chips, upwardly out of a tank containing the liquid which is being recirculated. Thus, the liquid can drain from the solids and return down the support to the tank. A discharge opening is provided through the inclined support at the upper end thereof, and the solids drop through this opening into a receptacle. The liquid exits the tank by overflowing a substantially horizontal weir edge adjacent the top of the tank, and is then recirculated to the machine tool.

While devices such as those disclosed in U.S. Pat. No. 4,052,311 have proved satisfactory for their intended purposes, they have not proved satisfactory in all respects. Specifically, these devices have a tendency to slow down and/or jam under certain circumstances particularly when certain objects, such as shop rags, drill bits, bolts and hand tools, get into the system. A jam not only presents a possibility of damage to the conveyor and flooding, but necessitates downtime which can substantially increase production costs.

Further, the separating of solids and liquids is sometimes less than satisfactory in these known devices. Specifically, the solids are sometimes conveyed so quickly up the inclined support that they are not fully drained when they pass through the discharge opening into the receptacle. Further if the shop floor on which the conveyor is supported is somewhat uneven, the weir edge may not be substantially horizontal, in which case the flow of the liquid over the weir edge will not be a shallow flow spread uniformly across the edge, but will be a deeper flow concentrated at the lowermost portion of the edge. Smaller solids present in the liquid can easily be carried with the deeper flow over the weir edge, necessitating further filtering of the liquid before it is returned to a collection tank or the sump of the machine.

Accordingly, an object of this invention is to provide a conveyor apparatus for separating solids from liquids and for conveying the solids from a lower to a higher elevation, said apparatus having a housing and conveying mechanism which minimize the possibility of the solids or objects jamming the conveyor and, if jamming does occur, it is quickly detected so as to avoid damage or loss of time.

A further object of the invention is the provision of a conveyor apparatus, as aforesaid, in which as much liquid as possible has been drained from the solids by the time they are discharged from the conveyor.

A further object of the invention is to provide a conveyor apparatus, as aforesaid, in which the weir edge of the tank is adjustable to a position in which it extends substantially horizontally so that the liquid exiting the tank flows over the weir edge with a uniform shallow depth throughout its length.

SUMMARY OF THE INVENTION

The objects and purposes of the invention, including those set forth above, are met by providing a conveyor apparatus having a pair of inclined, adjacent, upwardly opening troughs with a shelf therebetween, the lower ends of such troughs being received in a tank. A centerless helical flight is disposed in each trough for rotation about its longitudinal axis and drive mechanisms are provided for rotating the flights. The tank includes a pair of spaced, upstanding side walls and a pair of spaced baffle walls, between and spaced from the side walls which baffles extend above the top of the adjacent side walls, the tops of the side walls being defined by plates which are pivotally adjustable about horizontal axes transverse of the side walls. In one embodiment the drive mechanisms are connected to the helical flights at the upper ends thereof, and in another embodiment they are connected to the helical flights at the lower ends thereof. The drive mechanisms are operated by a control unit which is designed to periodically interrupt the rotation of the flights for a predetermined period of time. The control unit is also responsive to the load exerted on the drive mechanisms by the flights and reacts to an increase in such load, which may be caused by jamming by reversing the direction of rotation of the flights for a predetermined period of time and then reversing the flights again so they resume their original direction of rotation.

A cover is provided for the flights and an interlock mechanism cooperable with the cover and the drive mechanism is provided for halting rotation of the flights when the cover is opened and the flights are exposed.

In an alternative embodiment of the invention, a pair of horizontal, adjacent and upwardly opening troughs are provided in the tank and extend from a location remote from the lower ends of the inclined helixes to a location just above the lower ends of the inclined helixes. A centerless helical flight is supported for rotation about its longitudinal axis in each horizontal trough and a drive mechanism is provided for rotating the horizontal flights, such that solids in the tank are conveyed toward the lower ends of the inclined helixes.

BRIEF DESCRIPTION OF THE DRAWINGS

The invention will be more fully understood upon reading the following specification and inspecting the accompanying drawings, in which:

FIG. 1 is a broken, side view, partially in section, of a conveyor apparatus embodying the present invention;

FIG. 2 is a top view of the conveyor apparatus of FIG. 1;

FIG. 3 is a sectional view taken along the line III—III of FIG. 1;

FIG. 4 is a sectional view taken along the line IV—IV of FIG. 1;

FIG. 5 is a sectional view taken along the line V—V of FIG. 1;

FIG. 6 is a perspective view of an alternative embodiment of the conveyor apparatus of FIG. 1;

FIG. 7 is a broken side view, partially in section, showing a second alternative embodiment of the conveyor apparatus of FIG. 1;

FIG. 8 is a top view of the conveyor apparatus of FIG. 7; and

FIG. 9 is a sectional view taken along the line IX—IX of FIG. 7.

For convenience in reference, the words "up" and "down" will designate directions in the drawings to which reference is made. The words "in" and "out" will refer to directions toward and away from, respectively, the geometric center of the device and designated parts thereof. Such terminology will include derivatives and words of similar import.

DETAILED DESCRIPTION

FIGS. 1 and 3 illustrate a conveyor apparatus having a pair of inclined, adjacent, upwardly opening and elongated troughs 11 and 12 extending parallel to each other. Each trough has a semicylindrical center portion 11A and 12A and radially outwardly extending flange portions 11B and 11C, 12B and 12C along the edges of the center portions. The troughs are supported in their inclined positions by a support leg 13 (FIG. 2) which is secured to the troughs 11 and 12 in any convenient manner, such as by a bracket 14 and bolts 16, and by a support leg 17.

Centerless helical flights 18 and 19 are disposed in the semicylindrical center portions 11A and 12A of the troughs 11 and 12, respectively, and are rotatable about their lengthwise axes. Preferably, the helixes 18 and 19 have flights which respectively spiral in opposite rotational directions. A substantially planar shelf 21 (FIG. 3) extends between the troughs 11 and 12 and is secured in a conventional manner to the flange portions 11C and 12C thereof.

A discharge housing 22 (FIG. 2) is mounted to the upper ends of the troughs 11 and 12 and a hydraulic motor 23 is supported in the discharge housing 22 by a motor mounting plate 24 secured thereto. A hydraulic pump 25 supplies pressurized fluid to and from the motor 23 by conduits 26. The drive shaft of the motor 23 extends through the mounting plate 24 and is connected by a coupling 27 to a shaft 28 which in turn is connected to the upper end of the helical flight 18. A second hydraulic motor (not shown) is mounted on the plate 24 and is drivingly connected to the upper end of the helical flight 19.

A discharge opening 29 is provided in the bottom of the discharge housing 22 and solids conveyed up the troughs 11 and 12 by the flights 18 and 19 drop through the discharge opening 29 into a suitable receptacle (not shown) positioned therebelow.

As shown in FIG. 3, upright side walls 31 and 32 are respectively secured, as by welds 33 and 34, to the trough flange portions 11B and 12B. A top wall 39 is supported by the side walls 31 and 32 and includes a closure member 37 which is pivotally supported on the side wall 32 by a hinge 38 and is pivotal into an open position exposing the helical flights 18 and 19. An interlock 40 (FIG. 2) having a switch 41 integral therewith is mounted to the side wall 31 and the cover 37. The switch 41 may be an electric switch, a hydraulic valve or any similar mechanism. Here the switch 41 is electric and is connected by wires 42 to the hydraulic pump 25. The interlock 40 must be released to open the cover 37, and such release of the interlock 40 operates the switch 41, thereby stopping or bypassing the pump 25 to interrupt the flow of hydraulic fluid to the motors 23 which stops the rotation of the helical flights 18 and 19.

A tank 44 (FIGS. 1 and 2), provided at the lower end of the troughs 11 and 12, has side walls 31A and 32A which are coplanar extensions of the side walls 31 and 32, respectively. Recesses 46 and 47 are respectively provided at the top of each of the side walls 31A and 32A and have lower edges 48 and 49 which are inclined to extend substantially parallel to the axes of the helical flights 18 and 19. Side plates 51 and 52 are disposed respectively against the side walls 31 and 32 so as to cover the lower parts of the recesses 46 and 47 when the upper edges 53 and 54 of the plates extend substantially horizontally. The side plates 51 and 52 are supported on the edges 48 and 49, respectively, at their inner ends by the hook portions 56 or 57. The opposite ends of the side plates 51 and 52 are respectively held in place by clamps 61 and 62 (FIG. 5) which are supported by screw means 63 and 64 mounted on the side walls 31 and 32 and extending through openings in the clamps 61 and 62. The clamps 61 and 62 extend over the adjacent edges of the respective side plates 51 and 52 and, when the screw means are tightened, hold the side plates 51 and 52 securely against the side walls 31 and 32. A not illustrated seal can, if desired, be provided along the edges of the recesses 46 and 47 for engagement with the side plates 51 and 52 to prevent liquid from escaping the tank by seeping between a side plate 51 or 52 and the associated side wall 31 or 32.

The tank 44 also includes an end wall 69 (FIG. 2) which extends across the lower ends of the troughs 11 and 12 and the side walls 31 and 32. The end wall 69 consists of a lower portion 69A which extends substantially perpendicular to the longitudinal axes of the helical flights 18 and 19 and an upper portion 69B which extends upwardly and outwardly from the top of the portion 69A at an angle thereto.

Substantially horizontal top plates 71 and 72 (FIG. 4) are respectively attached to the upper edges of the upward extensions 31A and 32A of the side walls 31 and 32 and extend inwardly a short distance to points above the helixes 18 and 19. Baffle walls 73 and 74 are respectively attached to the inner edges of the top plates 71 and 72 and extend downwardly therefrom parallel to the side walls 31 and 32, the respective lower edges 76 and 77 of the baffle walls 73 and 74 being spaced slightly throughout their length from the peripheral edges of the flights 18 and 19 therebelow. Screens 78 and 79 may optionally be provided to extend respectively between the lower edges 76 and 77 of the baffle walls 73 and 74 to the adjacent side walls 31 and 32.

As shown in FIGS. 1 and 4, a tank cover 81 supported by the top plates 71 and 72 partially covers the opening between the baffle walls 73 and 74.

A control unit 84 (FIGS. 1 and 2) is mounted to the upper end of the discharge housing 22 and is connected by wires 86 to the hydraulic pump 25 and by wires 88 to a warning light 87 mounted on top of the housing 22. When the loads exerted on the motors 23 by the flights 18 and 19 increase, due to the jamming of the waste material being conveyed thereby, there is an increase in pressure in the hydraulic fluid being supplied by the pump 25 to the motors 23. A conventional and not illustrated pressure sensor in the hydraulic pump 25 is designed to detect this increase in fluid pressure and to indicate such increase to the control unit 84 through the wires 86. The control unit 84 responds by lighting the warning light 87 and by sending a signal through the wires 86 to the hydraulic pump 25.

The control unit 84 is also designed to periodically send a signal of predetermined duration through the wires 86 to the hydraulic pump 25 which causes the hydraulic pump 25 to cease supplying hydraulic fluid to the motors 23 for that predetermined period of time. This will cause the flights 18 and 19 to periodically cease rotating for the predetermined period of time, thereby increasing the amount of time required to convey waste material from the tank 44 to the discharge opening 29 and allowing more time for the liquid to drain from the solids being conveyed, such that the solids exiting through the discharge opening 29 are drier than in conventional conveyors.

The control unit 84 is conventional and therefore not described in detail. It is sufficient to state that the control unit 84 could have a pair of conventional timers or a conventional drum sequencer to control the stopping and starting of rotation of the flights 18 and 19 and the periods of time therebetween. Also, a conventional timer triggered by the signal from the pressure sensor could be provided to define the period of time during which the flights 18 and 19 are reversed from their normal direction of rotation.

As shown in FIG. 3, one or more magnets 91 may optionally be provided beneath the shelf 21 to facilitate the precipitation of the metallic solids being conveyed by the conveyor 10.

The alternate embodiment of FIG. 6 differs from the embodiment of FIGS. 1–5 only in that the motors 23 and shafts 28 are omitted from the discharge housing 22 and the helical flights 18 and 19 are rotationally driven from the lower ends thereof.

Specifically, a motor mounting plate 96 (FIG. 6) is mounted on the lower wall portion 69A and has two lateral extensions 96A and 96B. Hydraulic motors 97 and 98 are respectively mounted on the flanges 96A and 96B with their drive shafts 101 and 102 extending through openings in the flanges 96A and 96B. Sprockets 103 and 104 are mounted on the ends of the drive shafts 101 and 102. Shafts 106 and 107 extend through openings in the mounting plate 96 and end wall portion 69A and are respectively connected to the lower ends of the flights 18 and 19 in a conventional manner. Sprockets 108 and 109 are respectively mounted on the outer ends of the shafts 106 and 107 and chains 111 and 112 respectively connect the sprockets 103 and 108 to the sprockets 104 and 109. The hydraulic motors 97 and 98 are supplied with pressurized fluid and controlled in the manner described hereinabove with respect to the motors 23 of the embodiment of FIGS. 1–5.

FIGS. 7–9 illustrate a conveyor 10' which is a second alternative embodiment of the conveyor 10 of FIGS. 1–5. The parts thereof which are structurally and functionally identical to parts of the conveyor 10 are designated in FIGS. 7–9 with the same reference numerals utilized in FIGS. 1–5 and are not described here in detail. The conveyor 10' differs from the conveyor 10 primarily in the structure of the tank 116 at the lower end of the troughs 11 and 12, as described hereinafter.

The tank 116 (FIG. 8) extends horizontally substantially beyond the lower ends of the troughs 11 and 12 and has substantially vertical side walls 118 and 119 (FIG. 9) which are respectively connected to and coplanar with the side walls 31 and 32. The top edges of the tank side walls 118 and 119 are substantially horizontal and have respective recesses 121 and 122 (FIG. 7), the lower edges 123 and 124 of which are inclined rightwardly. Side plates 126 and 127 are pivotally mounted to the side walls 118 and 119 by hooks 128 and 129 and clamps 131 and 132 in a manner as described hereinabove with respect to the embodiment of FIGS. 1–5.

The bottom of the tank 116 (FIG. 7) is defined by an inclined wall 134, connected to the lower ends of the troughs 11 and 12 and substantially perpendicular to the lengthwise extents thereof, and by a pair of adjacent, parallel, upwardly opening and elongated troughs 136 and 137 which have their inner ends connected to the upper portion of the wall 134 and which extend horizontally away from the flights 18 and 19. A horizontal shelf 138 (FIG. 9) is provided between the troughs 136 and 137.

The tank 116 has an outer end wall 139 which extends between the side walls 118 and 119. The end wall 139 includes a substantially vertical lower portion 139A which is secured to the ends of the troughs 136 and 137 and an upper portion 139B which is inclined upwardly and outwardly from the top edge of the lower portion 139A.

Elongated, centerless and helical flights 141 and 142 (FIG. 8) are respectively disposed in the troughs 136 and 137 and are rotated by hydraulic motors 143 which are mounted to the lower end wall portion 139A and have drive shafts (not illustrated) which extend through openings in the end wall portion 139A and are drivingly coupled to the helical flights 141 and 142. The motors 143 driving the horizontal helixes 141 and 142 may be connected to the hydraulic pump 25 and controlled by the unit 84, so that the helixes 141 and 142 start and stop synchronously with the helixes 18 and 19. Alternatively, the motors 143 may be connected to an independent source of hydraulic fluid so that the helixes 141 and 142 run continuously.

Substantially horizontal top plates 146 and 147 are respectively secured to the top edges of the tank side walls 118 and 119 and extend inwardly to points above the helical flights 141 and 142. Baffle walls 148 and 149 are connected to the inner edges of the top plates 146 and 147 and extend downwardly therefrom to a point spaced slightly from the peripheral edges of the flights 141 and 142. The baffle walls 148 and 149 each extend toward the inclined troughs 11 and 12 a short distance past the end of the respective recesses 121 and 122 of the tank side walls 118 and 119. Vertical connecting walls 151 and 152 respectively extend from the ends of the baffle walls 148 and 149 adjacent the inclined troughs 11 and 12 to the side walls 118 and 119 and preferably have lower edges 153 and 154 (FIG. 9) which are spaced slightly from the helical flights 141 and 142 and are curved to conform to the circular shape of the flights 141 and 142.

If desired, screens 156 and 157 may be provided in the tank 116 respectively extending between the side walls 118 and 119 and the lower edges of the baffle walls 148 and 149 and extending longitudinally from the connecting walls 151 and 152 to the upper end wall portion 139B.

OPERATION

Although the operation of the conveyor apparatus described above will be apparent from the foregoing description by persons skilled in the art, a summary of such operation is now given for convenience.

Referring to the embodiment of FIGS. 1-5, the upper edges 53 and 54 of the respective side plates 51 and 52 are first adjusted so they are substantially horizontal. This is achieved by loosening the screw means 63 and 64 and pivoting the side plates 51 and 52 about the horizontal axes defined by the engagement of the hooks 56 and 57 with the side walls 31 and 32 until the top edges 53 and 54 are horizontal.

The screw means 63 and 64 are tightened against the clamps 61 and 62 so that the side plates 51 and 52 are firmly held against the side walls 31 and 32.

The hydraulic pump 25 is started and supplies hydraulic fluid to the motors 23 which effect rotation of the helical flights 18 and 19 in the troughs 11 and 12. The liquid and solids are deposited in a manner not shown into the tank 44 between the baffle walls 73 and 74. Referring to FIG. 4, the liquid flows downwardly between the baffle walls 73 and 74, beneath the lower edges 76 and 77 thereof, through the screens 78 and 79, and upwardly between the baffle walls 73 and 74 and the side walls 31 and 32, respectively, to flow over the horizontal top edges 53 and 54 of the side plates 51 and 52, and into a receptacle (not shown) which transfers the liquid to a suitable sump for recirculation, as to a machine tool. The optional screens 78 and 79 help retain the larger solids in the region of the flights 18 and 19 and the flow of the liquid over the top edges 53 and 54 of the side plates 51 and 52 with a shallow depth that is substantially uniform across the edges 53 and 54 prevents solids from being carried out of the tank 44 over the edges 53 and 54 with the liquid.

The solids deposited between the baffle walls 73 and 74 move to the bottom of the tank 44 and the rotating helical flights 18 and 19 advance the solids up the troughs 11 and 12 from the tank 44. The control unit 84 periodically sends a signal through the wires 86 to cause the hydraulic pump 25 to cease supplying hydraulic fluid to the motors 23 for a short period of time, thereby stopping the rotation of the flights 18 and 19 and allowing the liquid to drain from the solids being conveyed and run down the troughs 11 and 12 into the tank 44. When the solids reach the upper end of the troughs 11 and 12, they drop through the discharge opening 29 into a not illustrated receptacle.

If the solids being conveyed jam one or both of the rotating helical flights, a greater load will be placed on the hydraulic motors 23 and this load will be reflected by an increase in pressure in the hydraulic fluid driving the motors 23. This increase in fluid pressure will be detected by the pressure sensor in the hydraulic pump 25 and the control unit 84 will respond to the signal sent by the pressure sensor on the wires 86 by lighting the warning light 87 and temporarily reversing the flow of liquid from the hydraulic pump 25. The motors 23 will thus reverse the direction of rotation of the flights 18 and 19 to move the solids downwardly along the troughs 11 and 12 to break up the jam. Following a short, predetermined interval of time sufficient to dislodge the jam, the control unit 84 will again reverse the hydraulic pump 25, such that the motors 23 cause the flights 18 and 19 to resume their normal direction of rotation and convey the solids upwardly along the troughs 11 and 12.

If an operator opens the cover 37 over the flights 18 and 19 while the conveyor 10 is operating, the interlock 40 will act through the switch 41 to stop the hydraulic pump 25 or bypass the motors 23, thereby stopping the motors 23 and the rotating flights 18 and 19 to protect the operator from being injured if he reaches into the conveyor 10 for any reason. When the operator closes the cover 37, the interlock 40 is re-engaged and acts through the switch 41, the pump 25 and the motors 23 to restart the rotation of the flights 18 and 19.

The operation of the embodiment illustrated in FIG. 6 is identical in all respects to that described hereinabove with respect to the embodiment of FIGS. 1-5, and is therefore not described here in detail. However, it is noted that when small chips or cuttings are being conveyed, the embodiment of FIGS. 1-5 is preferred because the position of the motors 23 at the upper ends of the flights 18 and 19 prevents the small chips and cuttings from fouling the motors and associated bearings. Where larger and heavier solids are being conveyed from the tank 44, the embodiment of FIGS. 1-5 is less efficient because the torques generated within the flights 18 and 19 due to the distance between the motors 23 and the tank 44 tend to distort the shape of the flights. Accordingly, the embodiment of FIG. 8 is preferred in such situations since the motors 97 and 98 drivingly engage the flights 18 and 19 closer to the tank 44.

The operation of the conveyor 10' illustrated in FIGS. 7-9 is similar in most respects to the operation of the embodiment of FIGS. 1-5 described hereinabove. The only significant difference involves the presence of the two horizontal helixes 141 and 142, which convey the solids horizontally through the tank toward the inclined helixes 18 and 19, after which the solids drop downwardly along the inclined wall 134 and are then conveyed upwardly along the troughs 11 and 12 by the inclined helixes 18 and 19.

Although three preferred embodiments of the invention have been described in detail for illustrative purposes, it will be recognized that variations or modifications of the disclosed apparatus, including the rearrangement of parts, lie within the scope of the present invention. In particular, referring to the embodiment of FIGS. 7-9, it is not essential that the axes of the horizontal flights 141 and 142 respectively lie in the vertical planes which contain the longitudinal axes of the flights 18 and 19. The tank 116 could, for example, be constructed so that the longitudinal axes of the flights 141 and 142 extend at any desired angle with respect to the vertical planes containing the longitudinal axes of the flights 18 and 19.

The embodiments of the invention in which an exclusive property or privilege is claimed are defined as follows:

1. An apparatus for conveying and separating liquids and solids deposited therein, comprising:
   a pair of inclined, upwardly opening, adjacent and elongated trough means extending parallel to each other;
   an inclined, elongated helical flight disposed in each said trough means for rotation about its longitudinal axis;
   drive means for effecting rotation of said helical flights;
   tank means secured to said trough means and receiving the lower ends of said helical flights, said tank means having spaced and upright first wall means;
   a pair of second wall means disposed within said receiving tank means between and spaced from said first wall means for receiving said liquids and solids therebetween, said second wall means extending above the top of at least a portion of each said first wall means; and elongated edge means defining said portion of the top of each said first wall means, said edge means being adjustable about a horizontal axis transverse of said first wall means;

each said first wall means comprising an upright side wall having a recessed portion in the top edge thereof;

each said elongated edge means comprising a plate having a linear top edge and disposed against a side wall substantially parallel thereto to partially cover said recessed portion;

means pivotally supporting said plate on said side wall for effecting said adjustment of said top edge; and means for releasably securing said plate against pivotal movement and in a position in which said top edge of said plate is substantially horizontal;

whereby said solids introduced between said second wall means are conveyed by said rotating flights to the upper ends of said trough means and said liquid introduced between said second wall means passes under said second wall means and overflows the tops of said edge means.

2. The apparatus of claim 1, wherein said pivotally supporting means comprises hook means on said plate adjacent one end thereof which bears upon the lower edge of said recessed portion; and wherein said means for releasably securing said plate is mounted on said side wall and is cooperable with the end of said plate remote from said hook means.

3. The apparatus of claim 1, wherein each said second wall means extends parallel to the axes of said helical flights and has a lower edge which is spaced slightly throughout its length from the peripheral edges of a respective one of said helical flights.

4. The apparatus of claim 1, including a screen extending between each said first wall means and the adjacent one of said second wall means.

5. The apparatus of claim 1, including means cooperable with said drive means for providing a warning indication in response to a preselected increase in the load exerted on said drive means by said helical flights.

6. The apparatus of claim 1, including control means cooperable with said drive means for periodically halting the rotation of said helical flights for a predetermined period of time.

7. The apparatus of claim 1, including control means cooperable with said drive means and responsive to an increase in the load exerted on said drive means by said helical flights for reversing the direction of rotation of at least one of said helical flights for a predetermined period of time and then reversing the direction of rotation of such helical flight again so that it resumes its original direction of rotation.

8. The apparatus of claim 1, including cover means for said pair of trough means, at least a portion of said cover means being movable between an open position exposing said helical flights and a closed position substantially enclosing said helical flights; and including interlock means cooperable with said cover means and drive means for preventing rotation of said helical flights except when said cover means is in said closed position.

9. The apparatus of claim 1, including conveyor means in said tank means for conveying said solids deposited in said tank means from a location in said tank means remote from the lower ends of said flights to a location in said tank means adjacent the lower ends of said helical flights.

10. The apparatus of claim 9, wherein said conveyor means comprises a pair of adjacent, upwardly facing, elongated and horizontal trough means, an elongated, horizontal helical flight rotatably disposed in each said trough means, and second drive means for effecting rotation of said horizontal helical flights, one end of each said horizontal helical flight being positioned above the lower end of one of said inclined helical flights.

11. The apparatus of claim 10, wherein each said second wall means extends parallel to the axes of said horizontal helical flights and has a lower edge spaced slightly throughout its length from the peripheral edges of a respective one of said horizontal helical flights.

* * * * *